J. JOHNSON.
STALK DESTROYER.
APPLICATION FILED JULY 1, 1916.

1,208,976.

Patented Dec. 19, 1916.
3 SHEETS—SHEET 2.

Witnesses
F. C. Gibson
L. Wilcox

Inventor
James Johnson
By Victor J. Evans
Attorney

J. JOHNSON.
STALK DESTROYER.
APPLICATION FILED JULY 1, 1916.

1,208,976.

Patented Dec. 19, 1916.
3 SHEETS—SHEET 3.

Witnesses
F. C. Gibson
L. Wilcox

Inventor
James Johnson.

By Victor J. Evans
Attorney

UNITED STATES PATENT OFFICE.

JAMES JOHNSON, OF MOUND BAYOU, MISSISSIPPI.

STALK-DESTROYER.

1,208,976.  Specification of Letters Patent.  Patented Dec. 19, 1916.

Application filed July 1, 1916. Serial No. 107,157.

*To all whom it may concern:*

Be it known that I, JAMES JOHNSON, a citizen of the United States, residing at Mount Bayou, in the county of Bolivar and State of Mississippi, have invented new and useful Improvements in Stalk-Destroyers, of which the following is a specification.

This invention relates to destroyers especially to be used for cutting the stalks and branches of cotton plants and distributing the particles upon the surface of the ground for the purpose of permitting the sun to exert its force upon the said particles to destroy insects, as for instance boll weevil, which may be upon the stalks or branches.

An object of the invention is to provide a machine of the character indicated adapted to be drawn by draft animals along a row of standing stalks, the machine being provided with saws adapted to operate horizontally whereby the stalks and branches are reduced to particles. The said particles gravitate upon pans which are provided with saws adapted to reduce the particles to fine bits and distribute the said bits over the surface of the ground. The machine is also provided with a plow adapted to pass under the roots of the plants and lift them to the surface thus exposing the roots to the action of the sun. Immediately behind the plow the machine is provided with a series of rakes adapted to encounter the roots and pull them from the soil and leave them in exposed positions at the surface thereof. Suitable means are provided for operating the said saws from one of the supporting wheels of the machine.

Figure 1:
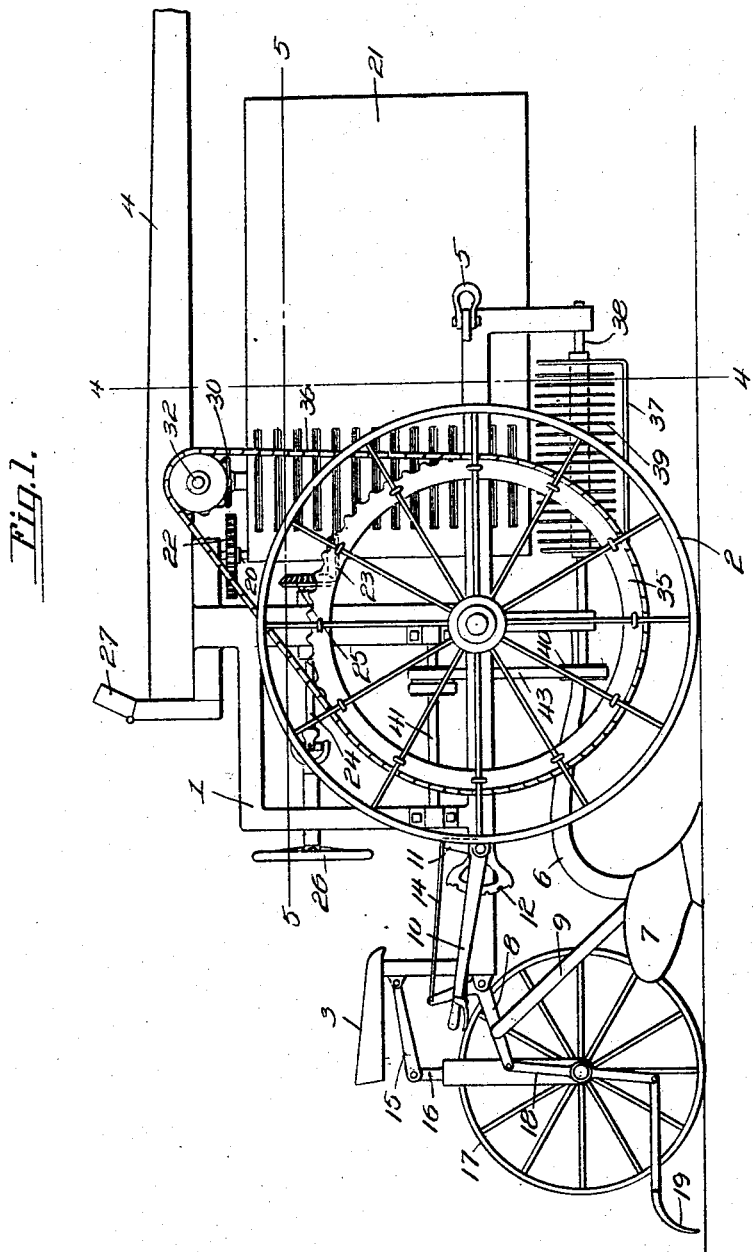
Figure 2:
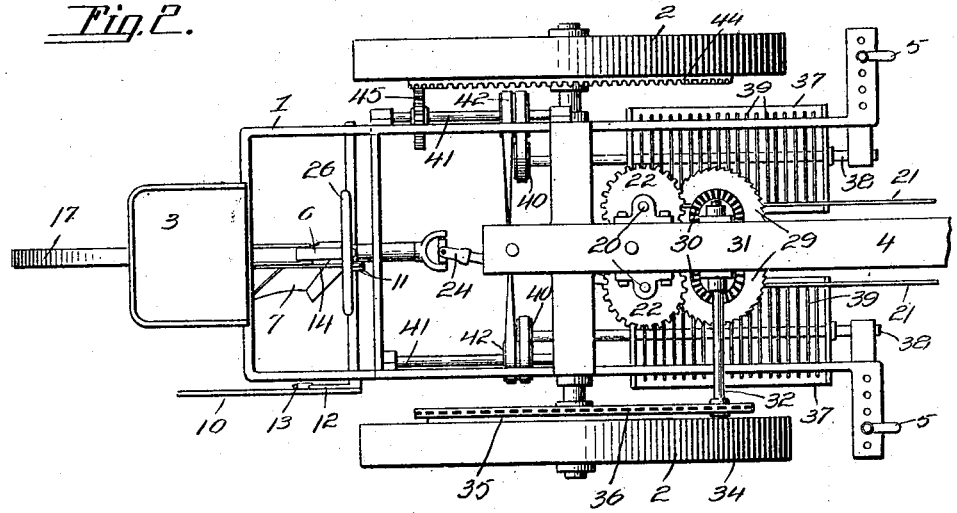
Figure 3:
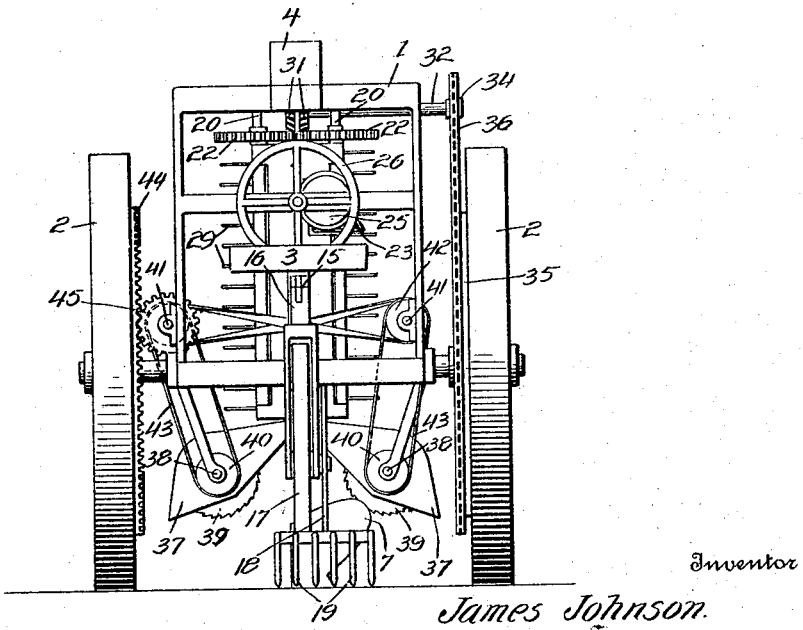
Figure 4:
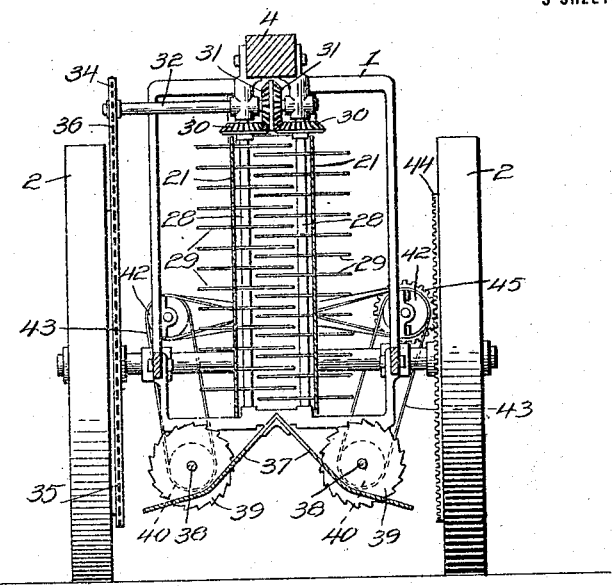
Figure 5:
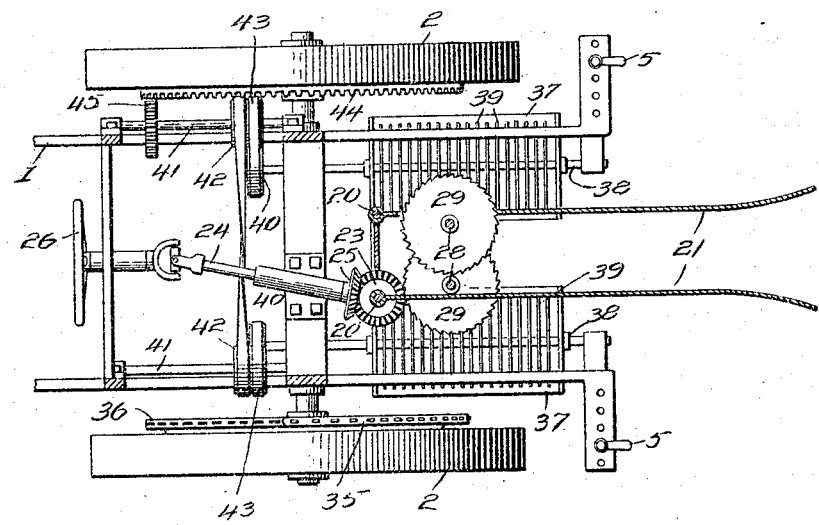

In the accompanying drawings:—Figure 1 is a side elevation of the stalk destroyer. Fig. 2 is a top plan view of the same. Fig. 3 is a rear elevation of the same. Fig. 4 is a transverse sectional view of the same cut on the line 4—4 of Fig. 1; Fig. 5 is a horizontal sectional view of the same cut on the line 5—5 of Fig. 1.

The stalk destroyer comprises a frame 1 preferably made of metal and of any suitable design or configuration. The frame 1 is mounted upon supporting wheels 2. An operator and driver's seat 3 is mounted upon the rear portion of the frame 1. A guiding tongue 4 is mounted at its rear end upon the upper portion of the frame 1 and extends in advance of the forward end of the said frame. A clevis 5 is mounted at the forward portion of the frame 1 and the draft appliances usually employed in conjunction with draft animals are attached with the clevis 5 in a usual manner.

A beam 6 is pivotally connected at its forward end with the intermediate portion of the frame 1 and the said beam carries at its rear end a plow 7 of conventional pattern. A bell crank lever 8 is pivoted upon the frame 1 and one arm of the said lever is operatively connected with the rear portion of the beam 6 by means of a link 9 which is pivotally connected at its ends with the said bell crank lever and the said beam. A lever 10 is fulcrumed upon the frame 1 and the rear end of the said lever is within reach of one who occupies the seat 3. The lever 10 is provided with an upwardly disposed angular extension 11 and a dentate segment 12 is mounted upon the frame 1 at the side of the lever 10. The lever 10 is provided with a spring pressed pawl 13 adapted to engage the teeth of the segment 12 whereby the said lever may be held at an adjusted position. A rod 14 is pivotally connected at one end with the upper end of the extension 11 and at its other end is pivotally connected with the upper arm of the bell crank lever 8.

An arm 15 is pivotally connected at its forward end with the post which supports the seat 3 and a bracket 16 is pivotally connected at its upper end with the rear end of the arm 15. A wheel 17 is journaled for rotation in the lower portion of the bracket 16 and is adapted to travel upon the bottom of the furrow which is opened by the plow 7. A bar 18 is pivotally connected at its upper end with the lower arm of the bell crank lever 8 and the axis upon which the wheel 17 rotates is journaled in the intermediate portion of the said bar 18. Rake tines 19 are pivotally connected at their forward ends with the lower portion of the bar 18 and the said tines are adapted to move over the slice of soil which is turned by the plow 7.

It will be seen that by swinging the lever 10 the rod 14 will be moved longitudinally whereby the bell crank lever 8 is swung upon the frame 1 and the link 9 is moved longitudinally. This movement on the part of the link 9 may raise or lower the rear end of the beam 6 and the plow 7 carried thereby. Inasmuch as the lower arm of the bell crank lever 8 is operatively connected with the axis of the wheel 7 by means of the bar 18 the said wheel 17 is raised and lowered simultaneously with the plow 7. During the raising and lowering movement of the wheel 17 the bracket 16 swings on its pivotal connection with the arm 15 and the said arm swings on its pivotal connection with the post of the seat 3. As the wheel 17 is raised or lowered the forward ends of the tines 19 are correspondingly moved and thus it will be seen that the plow 7 may be adjusted to operate at a desired distance below the surface of the soil.

Vertically disposed shafts 20 are mounted for turning movement upon the frame 1 and wings 21 are carried by the said shafts. The forward portions of the said wings are outwardly disposed and the rear portions of the said wings overlap each other. Gear wheels 22 are mounted upon the upper portion of the shafts 20 and mesh with each other. A beveled gear wheel 23 is fixed to one of the shafts 20 and a shaft 24 is journaled upon the frame 1. The shaft 24 carries at its forward end a beveled gear wheel 25 which meshes with the gear wheel 23. A hand wheel 26 is fixed to the rear end of the shaft 24 and is within reach of one who occupies the seat 3. By using the hand wheel 26 the shaft 24 may be turned and through the intermeshing gear wheels 25 and 23 the shaft 20 upon which the wheel 23 is mounted is turned. Inasmuch as the gear wheels 22 mesh with each other both of the said shafts 20 are simultaneously turned and thus the forward portions of the wings 21 may be moved away from or toward each other as desired. A fender 27 is mounted upon the frame 1 at the upper portion thereof and at a point behind the rear edges of the wings 21. The said fender is intended to prevent the tops of the plants from flying back and striking the operator who may occupy the seat 3 when the machine is in operation as will be hereinafter explained.

Vertically disposed shafts 28 are journaled for rotation upon the frame 1 and the said shafts are located between the wings 21 and in advance of the shafts 20. Circular saws 29 are carried by the shafts 28 and the saws upon the said shafts overlap each other at their edge portions. Intermeshing gear wheels 30 are carried at the upper ends of the shafts 28 and one of the said gear wheels 30 is provided at its upper side with a beveled set of gear teeth 31. A shaft 32 is journaled for rotation above the upper ends of the shafts 28 and carries a beveled gear wheel 33, which meshes with the gear teeth 31. A sprocket wheel 34 is mounted upon the shaft 32 and a sprocket ring 35 is attached to the side of one of the supporting wheels 2. A sprocket chain 36 is trained around the sprocket wheel 34 and the ring 35 and is adapted to transmit rotary movement from the wheel 2 to the shaft 32. As the shaft 32 rotates the gear wheel 33 which meshes with the teeth 31 rotates that shaft 28 which carries the said teeth and through the intermeshing gear wheels 30 both of the shafts 28 are rotated simultaneously but in opposite directions. Thus the saws 29 turn in opposite directions and as the stalks and branches of the plants are presented to the said saws, the said stalks and branches are cut by the action of the saws into sections or pieces. Should the tops of the plants have a tendency to slide in a rearward direction they will come in contact with the fender 27 and be prevented from striking the occupant of the seat 3. As the machine is moved along a row of standing plants the wings 21 receive the plants between them and present them to the saws 29 and the said saws operate upon the plants as just described. Also during the forward movement of the machine the plow 7 passes under the roots of the plants and turns a furrow slice to one side which brings the roots toward the surface of the soil and the tines following behind the plow 7 engage the said roots and drag them to the surface of the soil whereby they are exposed to the action of the sun.

Pans 37 are supported at the lower portion of the frame 1 below the lower edges of the wings 21 and the particles which fall from the saws 29 enter the said pans 37. The said pans are provided with downwardly and outwardly inclined bottoms along which the particles of the plants may move and from which they may fall upon the surface of the soil. Shafts 38 extend along the pans 37 and above the bottoms thereof and the said pans carry circular saws 39. The bottoms of the pans 37 are provided with openings which receive the lower portions of the saws 39. Pulleys 40 are carried at the rear ends of the shafts 38. A shaft 41 is journaled upon the frame 1 and a double pulley 42 is mounted upon the said shaft. Belts 43 are trained around the pulley 42 and the pulleys 40, one of the said belts being crossed. A gear ring 44 is carried at the side of one of the supporting wheels 2 and meshes with a gear wheel 45 mounted upon the shaft 41. Therefore it will be seen that as the wheels 2 rotate rotary movement is transmitted to the shaft 41 through the gear ring 44 and gear wheel 45 and inasmuch as the pulley 42 is carried by the shaft 41 and rotates with the same the belt 43 will transmit rotary movement to the shafts 38 which cause the saws 39 to rotate at the pans 37. The material which falls into the said pans 37 from between the wings 21 is operated upon by the saws 39 and reduced to very small particles or bits and these bits gravitate along the bottoms of the said pans 37 and fall from the outer edges thereof upon the surface of the soil at which point they are subjected to the action of the sun whereby all insect life is destroyed as just before indicated.

The operation of the machine is as follows:—As it is drawn along a row of standing plants the wings 21 gather the branches of the plants and present the said branches and stalks of the plants to the saws 29 which cut the branches and the stalks into sections. These sections fall into the pans 37 where they are acted upon by the saws 39 and reduced to very small particles or bits. From the said pans the bits gravitate beyond the edges thereof and are deposited upon the surface of the soil. The plow 7 following the wings 21 passes under the roots of the plants and turns them up and the tines 19 following the plow encounter the said roots and drag them from the soil and leave them at the surface thereof.

From the foregoing description taken in conjunction with the accompanying drawing, it will be seen that a stalk destroyer of simple and durable structure is provided and that the same may be used to advantage for reducing the stalks and branches of plants to small particles or bits whereby the said bits may be deposited at the surface of the ground to be acted upon by the sun to destroy insect life which may exist thereon.

Having described the invention what is claimed is:—

1. A stalk destroyer comprising a wheel mounted frame, wings movably mounted upon the frame, means for simultaneously moving the wings toward or away from each other, shafts journaled upon the frame, saws carried by the shafts and having overlapping portions located between the wings and means for rotating the shafts from one of the supporting wheels of the frame.

2. A stalk destroyer comprising a wheel mounted frame, wings mounted upon the frame, shafts journaled upon the frame, saws carried by the shafts and having overlapping portions located between the wings, pans located below the wings, shafts extending along the pans, saws carried by the last mentioned shafts and means for operating the shafts from one of the supporting wheels of the frame.

3. A stalk destroyer comprising a wheel mounted frame, wings mounted on the frame, shafts journaled upon the frame, saws carried by said shafts and having overlapping portions located between the wings, pans located below the wings and having inclined bottoms, shafts extending along the pans, saws carried by the last mentioned shafts and passing through the bottoms of the pans and means for operating the shafts from one of the supporting wheels of the frame.

In testimony whereof I affix my signature in presence of two witnesses.

JAMES JOHNSON.

Witnesses:
WILLIAM T. BROWN, Jr.,
JAKE PARKER.

Copies of this patent may be obtained for five cents each, by addressing the "Commissioner of Patents, Washington, D. C."